May 10, 1949.   B. COOPER   2,469,862
THYRATRON MOTOR CONTROL SYSTEM
Filed Feb. 6, 1948
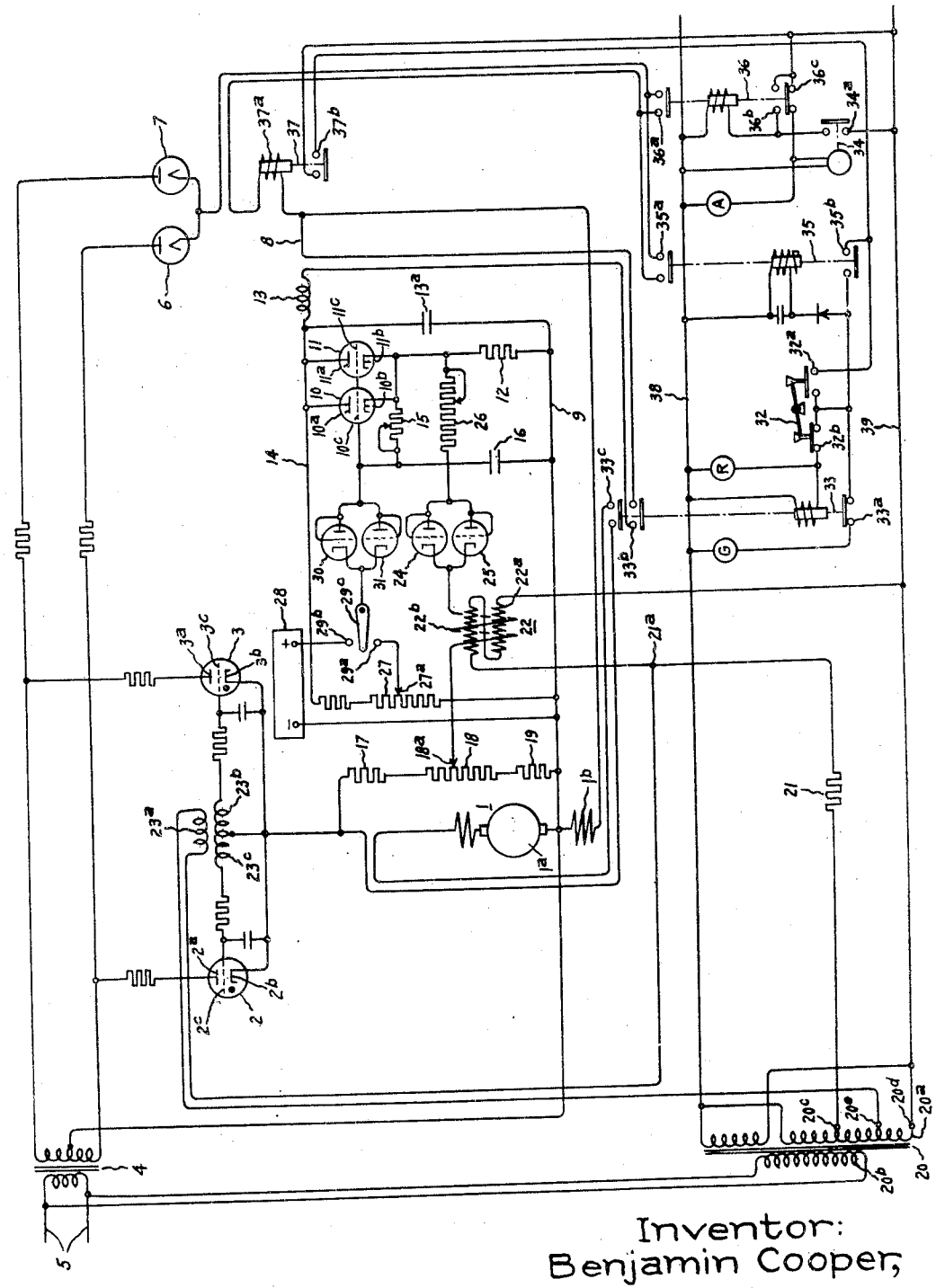
Inventor:
Benjamin Cooper,
by Claude A. Mott
His Attorney.

UNITED STATES PATENT OFFICE 2,469,862

THYRATRON MOTOR CONTROL SYSTEM

Benjamin Cooper, Scotia, N. Y., assignor to General Electric Company, a corporation of New York Application February 6, 1948, Serial No. 6,690

3 Claims. (Cl. 318—271)

This invention relates to control systems, more particularly to systems for controlling the operations of electric motors, and it has for an object the provision of a simple, reliable, improved and inexpensive control system of this character.

More particularly, this invention relates to motor control systems in which the motor is supplied from an electric valve rectifier and a further object of the invention is the provision of a reliable control system for effecting the acceleration of the motor at a selectable rate to a predetermined maximum value which, however, is adjustable through a range of values.

In carrying the invention into effect in one form thereof, the armature of a direct current motor is supplied with adjustable direct voltage from a controlled rectifier comprising electric valve apparatus provided with an anode, a cathode and a control grid. Also, the field winding is supplied from suitable means such as an electric valve rectifier. The simplified control system comprises an electric valve connected in series with a resistor across the field winding for producing across the resistor a reference voltage. Also between the cathode and negative field terminal a resistor and capacitor are connected in series with each other and their junction point is connected to the grid of the valve. A speed signal voltage is obtained from a voltage divider which is connected across the armature of the motor. The rectifier which supplies the armature is controlled by means of a network which varies the phase relationship of the grid and anode voltage and which comprises the reactance winding of a saturable reactor of which the saturating winding is connected to be responsive to the difference of the speed signal voltage and the variable reference voltage. This reference voltage is controlled to rise at a uniform rate thereby providing uniform acceleration of the motor. In order to limit the rise of the reference voltage to a predetermined value, a source of standard voltage is provided and an electric valve has its cathode connected to a point on the standard voltage source and its anode connected to the junction point of the capacitor and resistor to which is also connected the grid of the valve which supplies the reference voltage resistor.

For a better and more complete understanding of the invention, reference should now be had to the following specification and to the accompanying drawing of which the single figure is a simple diagrammatical sketch of one embodiment of the invention.

Referring now to the drawing, the armature $1a$ of a direct current motor $1$ is supplied from a rectifier comprising a pair of thyratron valves $2$ and $3$ which in turn are supplied through a suitable anode transformer $4$ from a source of alternating voltage such as is represented by the supply lines $5$. The thyratron $2$ has an anode $2a$, a cathode $2b$, and a control grid $2c$, and similarly the thyratron $3$ has an anode $3a$, a cathode $3b$ and a control grid $3c$. The anodes are connected to opposite terminals of the secondary winding of the supply transformer $4$, and the cathodes are connected through the armature $1a$ of the motor to the midtap of the secondary winding.

The motor $1$ is also provided with a separately excited field winding $1b$ to which direct voltage is supplied from a rectifier comprising diode electric valves $6$ and $7$. The anodes of these valves are connected to opposite terminals of the secondary winding of the supply transformer $4$ and the cathodes are connected through the field winding $1b$ to the center tap of the transformer.

For the purpose of controlling the acceleration of the motor from zero to full speed, means are provided for producing a variable reference voltage. These means comprise connections $8$ and $9$ for deriving from the voltage across the field winding $1b$ a direct control voltage together with a pair of electric valves $10$ and $11$ and a resistor $12$. The voltage derived from the terminals of the field winding is filtered by means of a filter comprising an inductance $13$ and a capacitor $13a$. Thus a substantially constant direct voltage appears across the conductors $14$ and $9$. The conductor $14$ is the positive conductor and the conductor $9$ is the negative conductor.

The valves $10$ and $11$ are provided with anodes $10a$ and $11a$, with cathodes $10b$ and $11b$, and with control grids $10c$ and $11c$. The anodes $10a$ and $11a$ are connected to the positive conductor $14$ and the cathodes $10b$ and $11b$ are connected through the resistor $12$ to the negative conductor $9$.

In parallel with the resistor $12$ between the cathodes $10b$ and $11b$ and the negative conductor $9$ are connected a resistor $15$ and a capacitor $16$ in series relationship with each other. One terminal of the resistor $15$ is connected to the cathodes $10b$ and $11b$ and one terminal of the capacitor $16$ is connected to the negative conductor $9$. The junction point of the resistor and the capacitor is connected to the grids $10c$ and $11c$.

The voltage drop across the resistor $12$ is the reference voltage. When the field winding $1b$ is deenergized the voltage across the resistor is zero and when the field is energized the valves 10 and 11 become conducting and supply a voltage to the resistor 12. As a result, the voltage across the resistor begins to rise. Simultaneously a voltage is supplied to the parallel circuit causing a charging current for the capacitor 16 to flow. This charging current produces a voltage drop across resistor 15 which provides a bias voltage on the grids of valves 10 and 11 such that the reference voltage across the resistor 12 rises at a substantially uniform rate.

For the purpose of obtaining a signal voltage proportional to the speed of the motor for comparison with the reference voltage, a voltage divider comprising potentiometer resistors 17, 18 and 19 is connected across the armature circuit of the motor 1. The intermediate portion of this voltage divider is provided with a slider 18a.

The output of the rectifier valves 2 and 3 is controlled by means of a phase shifting circuit which is energized from the lower half of the secondary winding 20a of a transformer 20 of which the primary winding 20b is supplied from a suitable source of alternating voltage such as the source 5. A resistor 21 and the reactance winding 22a of a saturable core reactor are connected in series relationship across the lower half of the winding 20a, i. e. from the intermediate terminal 20c to the lower terminal 20d. Between the junction point 21a of the reactance winding and resistor, and intermediate tap 20e of the lower half of the transformer secondary winding is connected the primary winding 23a of a grid transformer. This transformer has two secondary windings 23b and 23c. The winding 23c is connected in the grid-to-cathode circuit of the thyratron 2 and the winding 23b is connected in the grid-to-cathode circuit of the thyratron 3.

When the saturable reactor 22 is unsaturated, the reactance of the reactance winding 22a is relatively large with respect to the resistance of resistor 21 and the voltage supplied to the grids 2c and 3c of the thyratrons lags the voltages supplied to the anodes by approximately 180°. As the reactor becomes saturated, the voltage supplied to the grids is advanced with respect to the anode voltages of the thyratrons. When the grid voltages are advanced the maximum amount and are approximately in phase with the anode voltages, the rectifiers supply maximum voltage to the armature 1a of the motor.

Between the slider 18a of the armature circuit voltage divider and the cathode terminal of the reference voltage resistor 12, the saturating winding 22a of the saturable reactor the parallel connected rectifier valves 24 and 25 and a sensitivity adjusting potentiometer 26 are connected in series relationship with each other. Thus the saturation of the reactor 22 and the phase relationship of the grid and anode voltages of the armature circuit thyratrons 2 and 3 is responsive to the difference of the reference voltage across the resistor 12 and the speed signal voltage at slider 18a.

For the purpose of preventing the reference voltage from rising beyond a predetermined value, suitable take-over means are provided for controlling the valves 10 and 11. A standard voltage is obtained from either of two sources. If the operation of the motor is to be manually controlled, the standard voltage is obtained from the potentiometer 27 which is connected between the positive and negative control voltage connections 14 and 9. On the other hand, if the motor is to be controlled in response to some operating condition such as pressure or temperature, the standard voltage is obtained from the suitable instrument 28 which is illustrated conveniently in the drawing.

The potentiometer 27 is provided with a slider 27a by means of which the standard voltage may be adjusted to a desired value. It is connected to a stationary contact 29a of a transfer switch. Likewise the positive terminal of the instrument 28 is connected to the stationary contact 29b of the transfer switch and its negative terminal is connected to the negative conductor 9. The transfer switch has a movable contact 29c. Between this movable contact and the grids 10c and 11c of valves 10 and 11 a pair of rectifier valves 30 and 31 are connected in parallel with each other.

A suitable push button switch control station is provided for starting the motor. It comprises a main contact start-stop push button switch 32, a line switch 33, a motor-operated type time delay relay 34, a magnetic flux decay type time delay relay 35, and a control relay 36.

With the foregoing understanding of the elements and their organization, the operation of the system will readily be understood from the following detailed description. When power is supplied to the primary winding of transformer 20, the motor of the time delay relay 34 is energized, and after a predetermined time it closes its normally open contacts 34a to complete an energizing circuit for the operating coil of control relay 36. In response to energization, relay 36 closes its normally open contacts 36a and 36b and opens its normally closed contacts 36c. Contacts 36b in closing complete a holding circuit for the operating coil of relay 36 in parallel with the contacts 34a of the timing relay, and contacts 36c in opening disconnect the motor of the timing relay from the source. The closing of contacts 36a completes the circuit for the field winding 1b of the main motor 1 from the cathodes of the valves 6 and 7 through the contacts 36a and operating coil 37a of a field loss relay 37, through the field winding to the negative conductor 9. Responsively to energization, the relay 37 closes its normally open contacts 37b thereby partially establishing a circuit for the operating coil of the time delay relay 35 which is completed by closing the stop button contacts 32a. Relay 35 responds to the energization of its coil to close its contacts 35a and 35b. Contacts 35a in closing complete a circuit in parallel with the contacts 36a of the control relay, and thereby prevent deenergizing the relay 37 in response to a momentary interruption of power.

The operator new closes the start button contacts 32b to complete an energizing circuit for the operating coil of the line switch 33. This circuit is traced from the upper supply line 38, through the operating coil of contactor 33, contacts 32b of the start switch, contacts 35b of the relay 35, contacts 37b of the relay 37 to the side 39 of the source. Responsively to energization, the line switch opens its normally closed contacts 33a and closes its normally open contacts 33b and 33c. Contacts 33b in closing complete the connection between the upper terminal of the field winding 1b and the conductor 14, and contacts 33c in closing complete the circuit between the cathodes of the thyratrons 2 and 3 and the upper terminal of the armature 1a of the motor.

In response to the closing of contacts 33c, the thyratron valves supply a voltage to the armature. At this point, the saturating winding of the reactor is substantially deenergized. Consequently the grid voltage of the thyratrons lags the anode voltage the maximum amount of approximately 180° and therefore the voltage which is initially supplied to the armature is minimum. The closing of contacts 33b applies full anode voltage to the valves 10 and 11, with the result that they immediately begin to conduct. However, capacitor 16 which was initially discharged limits the rate of rise of voltage across the reference voltage resistor 12 by virtue of the voltage drop across resistor 15.

As pointed out in the foregoing, the voltage drop across resistor 15 is caused by the charging current to capacitor 16 and provides a bias on the grids of the valves 10 and 11 which varies in such a manner that the voltage across the reference voltage resistor 12 rises at a uniform rate.

As the voltage across resistor 12 increases, current flows through the valves 24 and 25 in parallel and through the saturating winding 22b of the saturable reactor to the slider 18a. As a result, the saturation of the reactor is increased and the reactance of the reactance winding 22a is correspondingly decreased, which has the result of advancing the phase of the grid voltage of the thyratrons 2 and 3 with respect to the anode voltage, thereby increasing the armature voltage until the voltage between the conductor 9 and the slider 18a nearly matches the reference voltage across the resistor 12.

This process continues until the voltage across the reference voltage resistor is increased to a point where the anodes of valves 30 and 31 become positive with respect to their cathodes, at which time they function as take-over diodes and prevent any further increase in the voltage across the resistor 12. Once the valves 30 and 31 become conducting, the voltage of their anodes with respect to the standard voltage point to which their cathodes are connected becomes fixed, and since their anodes are directly connected to the grids of the valves 10 and 11, the grid voltages of valves 10 and 11 cannot rise above the anode voltages of valves 30 and 31. The result is that the current conducted by valves 10 and 11 cannot increase any further, and consequently any further rise in the voltage across resistor 12 is prevented.

Moving the slider 27a of the manual speed controller adjusts the take-over point of the valves 30 and 31. When the transfer switch contact 29c engages the "automatic" contact 29b, the instrument 28 provides the voltage which determines the maximum speed.

The time rate of acceleration may be adjusted by the variable resistor 15. The sensitivity of the control may be adjusted by moving the slider of the potentiometer resistor 26.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A control system for an electric motor having an armature and a field winding comprising a source of control voltage, a first electric valve having an anode, a cathode and a control grid and having its anode connected to the positive side of said source, and a first resistor connected between said cathode and the negative side of said source for producing across said resistor a variable speed reference voltage, a capacitor and a second resistor connected in series with each other, a connection from the junction point of said capacitor and second resistor to said grid one terminal of said second resistor being connected to said cathode and one terminal of said capacitor being connected to the negative side of said source, rectifier means for supplying a direct voltage to said armature comprising electric valve apparatus having an anode, a cathode and a control grid, means for producing a signal voltage proportional to the speed of said motor, means responsive to the difference of said signal voltage and said reference voltage across said first resistor for varying the phase relationship of the grid and anode voltages of said rectifier to control the voltage supplied to said armature, a source of adjustable standard voltage, and means for limiting said reference voltage to a value corresponding to the value of said standard voltage comprising an electric valve having a cathode connected to a point on said standard voltage source and an anode connected to the junction point of said second resistor and said capacitor.

2. A control system for an electric motor having an armature and a field winding comprising a source of control voltage, a first electric valve having an anode, a cathode and a control grid and having its anode connected to the positive side of said source, and a first resistor connected between said cathode and the negative side of said source for producing across said resistor a variable speed reference voltage, a capacitor and a variable resistor connected in series, one terminal of said resistor being connected to said cathode and one terminal of said capacitor being connected to the negative side of said source, a connection from the junction point of said capacitor and second resistor to said grid, rectifier means for supplying a voltage to said armature comprising electric valve apparatus provided with an anode, a cathode and a control grid, means for producing a signal voltage proportional to the speed of the motor, means responsive to the difference of said signal voltage and said reference voltage for varying the phase relationship of the grid and anode voltages of said rectifier to vary the voltage supplied to said armature comprising a saturable reactor having a saturating winding connected between a point on said reference voltage resistor and a point on said speed signal voltage producing means, and having a reactance winding and connections from said reactance winding to the grid to cathode circuit of said rectifier, a source of adjustable standard voltage, and means for limiting said reference voltage to a value corresponding to said standard voltage comprising an electric valve having a cathode connected to a point on said standard voltage source and an anode connected to the junction point of said capacitor and said variable resistor.

3. A control system for an electric motor having an armature winding and a field winding comprising means for supplying to said field winding a direct voltage, means for deriving from the voltage across said field winding an adjustable standard voltage comprising a first potentiometer having a slider and having connections from its terminals to the positive and negative terminals of said geld winding, means for producing a variable reference voltage comprising a first electric valve having an anode, a cathode and a control grid and having its anode connected to said positive field connection and a first resistor connected between said cathode and said negative field connection, a capacitor and a second resistor connected in series, said capacitor and a second resistor connected in series, said capacitor having one terminal connected to said negative field connection and said second resistor having one terminal connected to said cathode, a connection from the junction point of said capacitor and resistor to said grid, rectifier means for supplying a direct voltage to said armature winding comprising electric valve apparatus having an anode, a cathode and a control grid, means for deriving from the armature voltage of said motor a signal voltage proportional to speed comprising a voltage divider connected across the armature of said motor, means responsive to the difference of said signal voltage and the reference voltage across said first resistor for varying the phase relationship of the grid and anode voltages of said rectifier to control the voltage supplied to said armature comprising a phase shifting network including a saturable reactor having a reactance winding and a saturating winding connected between a point on said voltage divider and a point on said first resistor, a rectifier connected in circuit with said saturating winding and connections from said reactance winding to the grid to cathode circuit of said rectifier, and means for limiting said reference voltage to a predetermined maximum value comprising an electric valve having a cathode connected to a point on said first potentiometer and having its anode connected to the junction point of said second resistor and capacitor.

BENJAMIN COOPER.

REFERENCES CITED

The following references are of record in the file of this patent:

UNITED STATES PATENTS

| Number | Name | Date |
|---|---|---|
| 2,312,117 | Moyer et al. | Feb. 23, 1943 |
| 2,422,567 | Puchlowski | June 17, 1947 |